United States Patent
Hapsari et al.

(10) Patent No.: US 8,504,045 B2
(45) Date of Patent: Aug. 6, 2013

(54) MOBILE COMMUNICATION METHOD AND RADIO BASE STATION

(75) Inventors: Wuri Andarmawanti Hapsari, Yokosuka (JP); Masayuki Motegi, Yokohama (JP); Yasuhiro Kato, Yokosuka (JP); Yoshitsugu Shimazu, Kawasaki (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 168 days.

(21) Appl. No.: 12/740,930

(22) PCT Filed: Oct. 30, 2008

(86) PCT No.: PCT/JP2008/069734
§ 371 (c)(1),
(2), (4) Date: Jul. 30, 2010

(87) PCT Pub. No.: WO2009/057684
PCT Pub. Date: May 7, 2009

(65) Prior Publication Data
US 2010/0297998 A1  Nov. 25, 2010

(30) Foreign Application Priority Data

Oct. 30, 2007  (JP) ................................. 2007-282380

(51) Int. Cl.
*H04W 36/00*  (2009.01)
(52) U.S. Cl.
USPC .......................... 455/438; 455/436; 455/422.1

(58) Field of Classification Search
USPC .............. 455/438, 422.1, 436, 450, 464, 509; 370/331, 332, 328, 329
See application file for complete search history.

(56) References Cited

U.S. PATENT DOCUMENTS

| | | | |
|---|---|---|---|
| 2007/0202877 A1* | 8/2007 | Hogan | 455/436 |
| 2007/0213058 A1* | 9/2007 | Shaheen | 455/436 |
| 2008/0192697 A1* | 8/2008 | Shaheen | 370/331 |
| 2010/0227614 A1* | 9/2010 | Chun et al. | 455/436 |

OTHER PUBLICATIONS

3GPP TS 36.413 V1.1.0 (Oct. 2007); 3rd Generation Partnership Project; Technical Specification Group Radio Access Network; Evolved Universal Terrestrial Access Network (E-UTRAN); S1 Application Protocol (S1AP); (Release 8).
3GPP TS 36.423 V1.0.1 (Oct. 2007); 3rd Generation Partnership Project; Technical Specification Group Radio Access Network; Evolved Universal Terrestrial Radio Access Network (EUTRAN); X2 Application Protocol (X2AP); (Release 8).

* cited by examiner

*Primary Examiner* — Chuong A Ngo
(74) *Attorney, Agent, or Firm* — Osha Liang LLP

(57) ABSTRACT

A radio base station (T-eNB) is configured to set up a data forwarding tunnel for forwarding user plane data to the radio base station (T-eNB) only for an access bearer for which the user plane data to be forwarded exists, when receiving a notification from a handover-source radio base station (S-eNB) as to whether or not the user plane data to be forwarded exists for each access bearer. The notification being made by using a handover request message for the mobile station (UE), and the access bearer being set up between the radio base station (T-eNB) and a upper level node (SGW).

27 Claims, 14 Drawing Sheets

FIG. 3

| IE/Group Name | Presence | Range | IE type and reference | Semantics description | Criticality | Assigned Criticality |
|---|---|---|---|---|---|---|
| Message Type | M | | | | | |
| Old eNB UE X2AP ID | M | | | eNB UE X2AP ID allocated at the old eNB | | |
| Target Cell ID | | | | | | |
| UE Context Information | M | | | | | |
| >MME UE S1AP ID | M | | | MME UE S1AP ID allocated at the MME | | |
| >SAE Bearers To Be Setup List | | 1 to <maxnoof SAEbearers> | | | | |
| >>SAE Bearer Info | M | | | | | |
| >>>SAE Bearer ID | M | | | | | |
| >>>UL GTP Tunnel Endpoint | M | | 9.2.1 | SGW tunnel endpoint. For delivery of UL PDUs | | |
| >>>RB type (QCI) | M | | | | | |
| >>>Forwarding Indicator | M | | | | | |
| >RRC Context | M | | | to transfer UE RAN context, details are FFS | | |
| UE History Information | M | | 9.2.3 | | YES | |
| Trace activation | O | | 9.2.2 | | | ignore |

FIG. 4

| IE/Group Name | Presence | Range | IE type and reference | Semantics description | Criticality | Assigned Criticality |
|---|---|---|---|---|---|---|
| Message Type | M | | | | | |
| Old eNB UE X2AP ID | M | | | eNB UE X2AP ID allocated at the old eNB | | |
| Target Cell ID | | | | | | |
| UE Context Information | M | | | | | |
| >MME UE S1AP ID | M | | | MME UE S1AP ID allocated at the MME | | |
| >SAE Bearers To Be Setup List | M | 1 to <maxnoof SAEbearers> | | | | |
| >>SAE Bearer Info | | | | | | |
| >>>SAE Bearer ID | M | | | | | |
| >>>UL GTP Tunnel Endpoint | M | | 9.2.1 | SGW tunnel endpoint. For delivery of UL PDUs | | |
| >>>RB Type (QCI) | M | | | | | |
| >SAE Bearers To Be Forwarded List | M | 1 to <maxnoof SAEbearers> | | | | |
| >>SAE Bearer Info | | | | | | |
| >>>SAE Bearer ID | M | | | | | |
| >>>RB type (QCI) | M | | | | | |
| >RRC Context | M | | 9.2.3 | to transfer UE RAN context, details are FFS | | |
| UE History Information | M | | 9.2.2 | | | |
| Trace activation | O | | | | YES | ignore |

FIG. 5

| IE/Group Name | Presence | Range | IE type and reference | Semantics description | Criticality | Assigned Criticality |
|---|---|---|---|---|---|---|
| Message Type | M | | | | | |
| Old eNB UE X2AP ID | M | | | eNB UE X2AP ID allocated at the old eNodeB | | |
| New eNB UE X2AP ID | M | | | New eNB UE X2AP ID allocated at the new eNodeB | | |
| SAE Bearers Admitted List | | | | | | |
| >SAE Bearer Info | | 1 to <maxnoof SAEbearers> | | | | |
| >>SAE Bearer ID | M | | | | | |
| >>DL GTP Tunnel Endpoint | O | | | Target eNB tunnel endpoint. For delivery of DL PDUs | | |
| >>Forwarding GTP Tunnel Endpoint | O | | | Target eNB tunnel endpoint for data forwarding | | |
| SAE Bearers Not Admitted List | | | | | | |
| >SAE Bearer Info | | 1 to <maxnoof SAEbearers> | | | | |
| >>SAE Bearer ID | M | | | | | |
| >>Cause | M | | | | | |
| Target eNodeB to Source eNodeB Transparent Container | M | | | It includes HO info for the UE | | |

FIG. 6

| IE/Group Name | Presence | Range | IE type and reference | Semantics description | Criticality | Assigned Criticality |
|---|---|---|---|---|---|---|
| Message Type | M | | | | | |
| Old eNB UE X2AP ID | M | | | eNB UE X2AP ID allocated at the old eNodeB | | |
| New eNB UE X2AP ID | M | | | New eNB UE X2AP ID allocated at the new eNodeB | | |
| SAE Bearers Admitted List | | | | | | |
| >SAE Bearer Info | | 1 to <maxnoof SAEbearers> | | | | |
| >>SAE Bearer ID | M | | | | | |
| >>DL GTP Tunnel Endpoint | O | | | Target eNB tunnel endpoint. For delivery of DL PDUs | | |
| SAE Bearers Fowarded List | | | | | | |
| >SAE Bearer Info | | 1 to <maxnoof SAEbearers> | | | | |
| >>SAE Bearer ID | M | | | | | |
| >>Fowarding Tunnel Endpoint | O | | | Target eNB tunnel endpoint for data forwarding | | |
| SAE Bearers Not Admitted List | | | | | | |
| >SAE Bearer Info | | 1 to <maxnoof SAEbearers> | | | | |
| >>SAE Bearer ID | M | | | | | |
| >>Cause | M | | | | | |
| Target eNodeB to Source eNodeB Transparent Container | M | | | It includes HO info for the UE | | |

FIG. 9

| IE/Group Name | Presence | Range | IE type and reference | Semantics description | Criticality | Assigned Criticality |
|---|---|---|---|---|---|---|
| Message Type | M | | | | | |
| MME UE S1AP ID | M | | | | | |
| Cause | M | | | | | |
| SAE Bearers To Be Setup List | | 1 to <maxnoof SAEbearers> | | | | |
| >SAE Bearer ID | M | | | | | |
| >Transport Layer Address | M | | | | | |
| >GTP TEID | M | | | To deliver UL PDUs | | |
| >SAE Bearer level QoS Parameters | M | | | Note:Label, ARP | | |
| >Forwarding Indicator | M | | | To show whether data forwarding is needed | | |
| Intra-LTE HO Information List | C-ifIntraLTE | | | | | |
| >Source eNodeB to Target eNodeB Transparent Container | M | | | | | |
| LTE to UTRAN HO Information List | C-ifLTEto UTRAN | | | | | |
| >Source RNC to Target RNC Transparent Container | M | | | FFS if this is mandatory and needed | | |
| LTE to GERAN HO Information List | C-ifLTEto GERAN | | | | | |
| >Source BSS to Target BSS Transparent Container | M | | | FFS if this is mandatory and needed | | |

FIG. 10

| IE/Group Name | Presence | Range | IE type and reference | Semantics description | Criticality | Assigned Criticality |
|---|---|---|---|---|---|---|
| Message Type | M | | | | | |
| MME UE S1AP ID | M | | | | | |
| Cause | M | | | | | |
| SAE Bearers To Be Setup List | | 1 to <maxnoof SAEbearers> | | | | |
| >SAE Bearer ID | M | | | | | |
| >Transport Layer Address | M | | | | | |
| >GTP TEID | M | | | To deliver UL PDUs | | |
| >SAE Bearer level QoS Parameters | M | | | Note:Label, ARP | | |
| SAE Bearers To Be Forwarded List | | 1 to <maxnoof SAEbearers> | | | | |
| >SAE Bearer ID | M | | | | | |
| >Transport Layer Address | M | | | | | |
| >GTP TEID | M | | | To deliver forwarded PDUs | | |
| >SAE Bearer level QoS Parameters | M | | | Note:Label, ARP | | |
| Intra-LTE HO Information List | C-ifIntraLTE | | | | | |
| >Source eNodeB to Target eNodeB Transparent Container | M | | | | | |
| LTE to UTRAN HO Information List | C-ifLTEto UTRAN | | | | | |
| >Source RNC to Target RNC Transparent Container | M | | | FFS if this is mandatory and needed | | |
| LTE to GERAN HO Information List | C-ifLTEto GERAN | | | | | |
| >Source BSS to Target BSS Transparent Container | M | | | FFS if this is mandatory and needed | | |

FIG. 11

| IE/Group Name | Presence | Range | IE type and reference | Semantics description | Criticality | Assigned Criticality |
|---|---|---|---|---|---|---|
| Message Type | M | | | | | |
| MME UE S1AP ID | M | | | | | |
| eNB UE S1AP ID | M | | | allocated at the target eNodeB | | |
| SAE Bearers Admitted List | | 1 to <maxnoof SAEbearers> | | | | |
| >SAE Bearer ID | M | | | | | |
| >Transport Layer Address | M | | | | | |
| >GTP TEID | M | | | To deliver DL PDUs | | |
| >GTP TEID | | | | Target eNB tunnel endpoint for data forwarding | | |
| SAE Bearers Failed to Setup List | | 1 to <maxnoof SAEbearers> | | | | |
| >SAE Bearer ID | M | | | | | |
| >Cause | M | | | | | |
| Intra-LTE HO Information List | C-ifIntraLTE | | | | | |
| >Target eNodeB to Source eNodeB Transparent Container | M | | | It includes HO Command info for the UE | | |
| LTE to UTRAN HO Information List | C-ifLTEto UTRAN | | | | | |
| >Target RNC to Source RNC Transparent Container | M | | | FFS if this is mandatory and needed | | |
| LTE to GERAN HO Information List | C-ifLTEto GERAN | | | | | |
| >Target BSS to Source BSS Transparent Container | M | | | FFS if this is mandatory and needed | | |

FIG. 12

| IE/Group Name | Presence | Range | IE type and reference | Semantics description | Criticality | Assigned Criticality |
|---|---|---|---|---|---|---|
| Message Type | M | | | | | |
| MME UE S1AP ID | M | | | | | |
| eNB UE S1AP ID | M | | | allocated at the target eNodeB | | |
| SAE Bearers Admitted List | | 1 to <maxnoof SAEbearers> | | | | |
| >SAE Bearer ID | M | | | | | |
| >Transport Layer Address | M | | | | | |
| >GTP TEID | M | | | To deliver DL PDUs | | |
| SAE Bearers To Be Forwarded List | | 1 to <maxnoof SAEbearers> | | | | |
| >SAE Bearer ID | M | | | | | |
| >Transport Layer Address | M | | | | | |
| >GTP TEID | M | | | Target eNB tunnel endpoint for data forwarding | | |
| SAE Bearers Failed to Setup List | | 1 to <maxnoof SAEbearers> | | | | |
| >SAE Bearer ID | M | | | | | |
| >Cause | M | | | | | |
| Intra-LTE HO Information List | C-ifIntraLTE | | | | | |
| >Target eNodeB to Source eNodeB Transparent Container | M | | | It includes HO Command info for the UE | | |
| LTE to UTRAN HO Information List | C-ifLTEto UTRAN | | | | | |
| >Target RNC to Source RNC Transparent Container | M | | | FFS if this is mandatory and needed | | |
| LTE to GERAN HO Information List | C-ifLTEto GERAN | | | | | |
| >Target BSS to Source BSS Transparent Container | M | | | FFS if this is mandatory and needed | | |

FIG. 13

| IE/Group Name | Presence | Range | IE type and reference | Semantics description | Criticality | Assigned Criticality |
|---|---|---|---|---|---|---|
| Message Type | M | | | | | |
| MME UE S1AP ID | M | | | | | |
| eNB UE S1AP ID | M | | | | | |
| SAE Bearers Subject to Setup List | | 0 to <maxnoof SAEbearers> | | FFS | | |
| >SAE Bearer ID | M | | | FFS | | |
| >Transport Layer Address | M | | | FFS | | |
| >GTP TEID | O | | | To deliver forwarded PDUs | | |
| SAE Bearers to Release List | | 0 to <maxnoof SAEbearers> | | | | |
| >SAE Bearer ID | M | | | | | |
| Intra-LTE HO Information List | C-ifIntraLTE | | | | | |
| >Target eNodeB to Source eNodeB Transparent Container | M | | | | | |
| LTE to UTRAN HO Information List | C-ifLTEto UTRAN | | | | | |
| >Target RNC to Source RNC Transparent Container | M | | | FFS if this is mandatory and needed | | |
| LTE to GERAN HO Information List | C-ifLTEto GERAN | | | | | |
| >Target BSS to Source BSS Transparent Container | M | | | FFS if this is mandatory and needed | | |

MOBILE COMMUNICATION METHOD AND RADIO BASE STATION

TECHNICAL FIELD

The present invention relates to a mobile communication method and a radio base station.

BACKGROUND ART

A next-generation mobile communication system (for example, LTE: Long Term Evolution) following the IMT-2000 (International Mobile Telecommunication-2000) system is configured to set up an access bearer for transmitting user plane (U-plane) data between a RAN (Radio Access Network) node (for example, radio base station eNB) and a core node (for example, SGW: Serving Gateway).

Such access bearer is formed by GTP (GPRS Tunneling Protocol) tunnel.

Also, in the LTE mobile communication system, a radio bearer is configured to be set up between a mobile station UE and the RAN node.

Furthermore, in the LTE mobile communication system, an EPS (Evolved Packet System) bearer is configured to be set up between the mobile station UE and the core node.

When a mobile station performs a handover from a handover-source radio base station to a handover-target radio base station, a GTP tunnel is configured to be set up between the handover-source radio base station and the handover-target radio base station. The handover-source radio base station and the handover-target radio base station are under the control of the same core node. Then, the user plane data corresponding to each access bearer is configured to be forwarded from the handover-source radio base station to the handover-target radio base station via the GTP tunnel.

However, in the LTE mobile communication system, when such handover as described above is performed, the GTP tunnels corresponding to all the access bearers set up between the handover-source radio base station and the core node are configured to be set up, regardless of whether or not user plane data to be forwarded from the handover-source radio base station to the handover-target radio base station exists. Thus, the system has a problem of wastefully using resources.

DISCLOSURE OF THE INVENTION

Thus, the present invention has been made in view of the problem described above. It is an objective of the present invention to provide a mobile communication method and a radio base station by which, when a mobile station performs a handover from a handover-source radio base station to a handover-target radio base station, resources can be used effectively by eliminating redundant setup of GTP tunnels for forwarding user plane data from the handover-source radio base station to the handover-target radio base station.

A first aspect of the present invention is summarized as a mobile communication method in which a mobile station performs a handover from a handover-source radio base station to a handover-target radio base station, the method including the steps of: (A) judging whether or not user plane data to be forwarded to the handover-target radio base station exists for each access bearer set up with an upper level node, when a handover for the mobile station is determined to be performed; (B) notifying, to the handover-target radio base station, a result of the judgment by using a handover request message for the mobile station; (C) setting up a data forwarding tunnel for forwarding user plane data from the handover-source radio base station to the handover-target radio base station only for an access bearer for which the user plane data to be forwarded exists, and notifying, to the handover-source radio base station, setup information on the data forwarding tunnel by using a handover request response message for the handover request message; and (D) forwarding the user plane data to the handover-target radio base station by the handover-source radio base station via the data forwarding tunnel on the basis of the setup information on the data forwarding tunnel.

In the first aspect, the handover-source radio base station and the handover-target radio base station can be provided under the control of a same upper level node; in the step (A), the handover-source radio base station can make the judgment; in the step (B), the handover-source radio base station can notify, to the handover-target radio base station, the result of the judgment by using the handover request message for the mobile station; and in the step (C), the data forwarding tunnel can be set up not through the upper level node.

In the first aspect, the setup information on the data forwarding tunnel can be a GTP TE-ID for the handover-target radio base station in the data forwarding tunnel.

In the first aspect, the handover-source radio base station and the handover-target radio base station can be provided under the control of different upper level nodes, respectively; and in the step (C), the data forwarding tunnel can be set up through the upper level nodes, and the setup information on the data forwarding tunnel can be notified to the handover-source radio base station through the upper level nodes.

In the first aspect, the handover-source radio base station and the handover-target radio base station can be provided under the control of different upper level nodes, respectively; and in the step (C), the data forwarding tunnel can be set up not through the upper level nodes, and the setup information on the data forwarding tunnel can be notified to the handover-source radio base station not through the upper level nodes.

In the first aspect, the setup information on the data forwarding tunnel can be a GTP TE-ID for the upper level nodes in the data forwarding tunnel.

In the first aspect, the handover request message for the mobile station can include instruction information indicating whether or not the user plane data to be forwarded to the handover-target radio base station exists, for each access bearer.

In the first aspect, the handover request message for the mobile station can include a list of the access bearers for which the user plane data to be forwarded to the handover-target radio base station exists.

A second aspect of the present invention is summarized as a radio base station capable of serving as a handover-target radio base station in a mobile communication system in which a mobile station can perform a handover, wherein the handover-target radio base station is configured to set up a data forwarding tunnel for forwarding user plane data to the handover-target radio base station only for an access bearer for which the user plane data to be forwarded exists, when receiving a notification from a handover-source radio base station as to whether or not the user plane data to be forwarded exists for each access bearer, the notification being made by using a handover request message for the mobile station, and the access bearer being set up between the handover-source radio base station and a upper level node; and the handover-target radio base station is configured to notify, to the handover-source radio base station, setup information on the data forwarding tunnel by using a handover request response message for the handover request message.

A third aspect of the present invention is summarized as a radio base station capable of serving as a handover-target radio base station in a mobile communication system in which a mobile station can perform a handover, wherein the handover-target radio base station is configured to set up a data forwarding tunnel for forwarding user plane data to the handover-target radio base station only for an access bearer for which the user plane data to be forwarded exists, when receiving a notification from a upper level node as to whether or not the user plane data to be forwarded exists for each access bearer, the notification being made by using a handover request message for the mobile station, and the access bearer being set up between a handover-source radio base station and the upper level node; and the handover-target radio base station is configured to notify, to the handover-source radio base station, setup information on the data forwarding tunnel via the upper level node by using a handover request response message for the handover request message.

In the second and third aspect, the handover request message for the mobile station can include instruction information indicating whether or not the user plane data to be forwarded to the radio base station exists for each access bearer.

In the second and third aspect, the handover request message for the mobile station can include a list of the access bearers for which the user plane data to be forwarded to the handover-target radio base station exists.

In the second and third aspect, the handover-source radio base station and the handover-target radio base station can be provided under the control of a same upper level node; the data forwarding tunnel can be set up not through the upper level node; and the setup information on the data forwarding tunnel can be a GTP TE-ID for the handover-target radio base station in the data forwarding tunnel.

In the second and third aspect, the handover-source radio base station and the handover-target radio base station can be provided under the control of different upper level nodes, respectively; the handover request message for the mobile station can be transmitted to the handover-target radio base station through a handover-source upper level node and a handover-target upper level node; the data forwarding tunnel can be set up through the handover-source upper level node and the handover-target upper level node; the setup information on the data forwarding tunnel can be notified to the handover-source radio base station through the handover-source upper level node and the handover-target upper level node; and the setup information on the data forwarding tunnel notified to the handover-source radio base station can be a GTP TE-ID for the handover-source upper level node in the data forwarding tunnel.

BRIEF DESCRIPTION OF THE DRAWINGS

FIG. 3 is a table showing an example of a format of "Handover Request" used in the mobile communication system according to the first embodiment of the present invention.

FIG. 4 is a table showing another example of the format of "Handover Request" used in the mobile communication system according to the first embodiment of the present invention.

FIG. 5 is a table showing an example of a format of "Handover Request ACK" used in the mobile communication system according to the first embodiment of the present invention.

FIG. 6 is a table showing another example of the format of "Handover Request ACK" used in the mobile communication system according to the first embodiment of the present invention.

FIG. 9 is a table showing an example of a format of "Handover Request" used in the mobile communication system according to the second embodiment of the present invention.

FIG. 10 is a table showing another example of the format of "Handover Request" used in the mobile communication system according to the second embodiment of the present invention.

FIG. 11 is a table showing an example of a format of "Handover Request Acknowledge" used in the mobile communication system according to the second embodiment of the present invention.

FIG. 12 is a table showing another example of the format of "Handover Request Acknowledge" used in the mobile communication system according to the second embodiment of the present invention.

FIG. 13 is a table showing an example of a format of "Handover Command" used in the mobile communication system according to the second embodiment of the present invention.

BEST MODES FOR CARRYING OUT THE INVENTION

Configuration of Mobile Communication System According to First Embodiment of Present Invention A configuration of a mobile communication system according to a first embodiment of the present invention will be described with reference to FIGS. 1 to 6.

In the mobile communication system according to the first embodiment, a radio access network is configured by multiple upper level nodes (core nodes) SGW/MME (Mobility Management Entity) and multiple radio base stations eNB.

Figure 1:
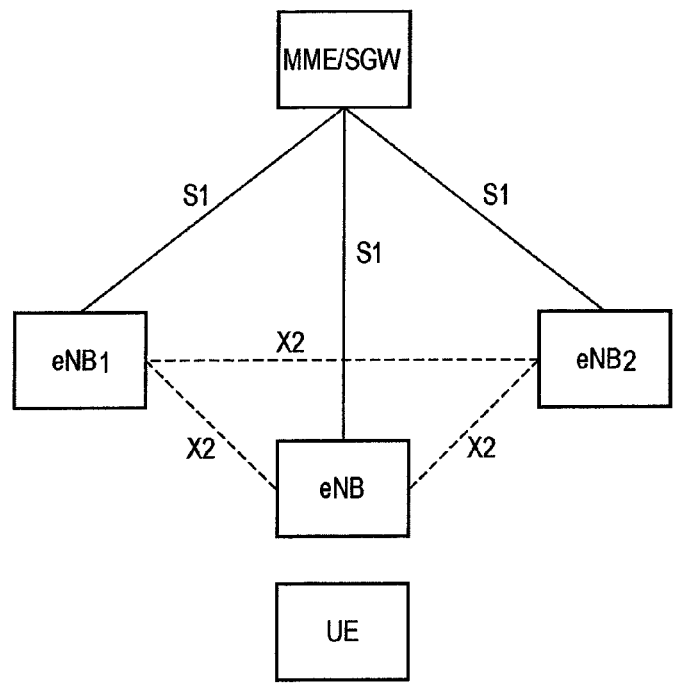
FIG. 1 is an overall configurational diagram of a mobile communication system according to a first embodiment of the present invention.

As shown in FIG. 1, the first embodiment will be described by illustrating a mobile communication system having the architecture of the LTE/SAE which is being standardized by the 3GPP; however, the present invention is not limited to such mobile communication system, and may also be applied to a mobile communication system having another architecture.

The MME is a node to handle control data, and the SGW is a node to handle user data.

The radio base stations eNB are connected to each other via an interface called X2 interface, and each radio base station eNB and its upper level nodes MME/SGW are connected via an interface called S1 interface.

Over the S1 interface and X2 interface, control plane (C-plane) data and user plane (U-plane) data can be transmitted.

In particular, the user plane data is transmitted by GTP-U/UDP, and a GTP tunnel to transmit the user plane data is set up by exchanging a GTP TE (Tunnel Endpoint)-ID between the radio base station eNB and its upper level node SGW.

Figure 2:
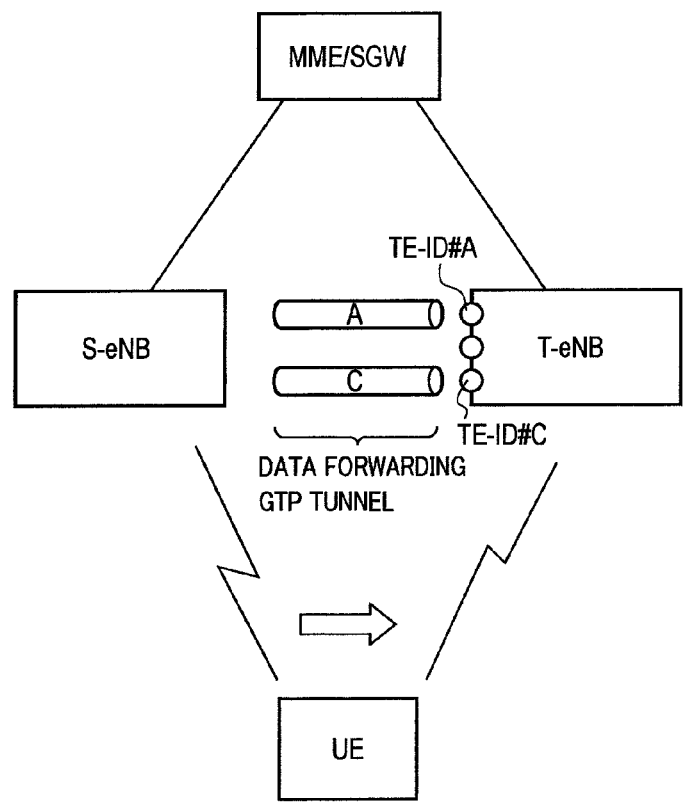
FIG. 2 is a diagram showing data forwarding GTP tunnels set up in the mobile communication system according to the first embodiment of the present invention.

As shown in FIG. 2, the first embodiment will be described based on a case where a mobile station UE performs a handover (X2 handover) from a handover-source radio base station S-eNB to a handover-target radio base station T-eNB. Here, the handover-source radio base station S-eNB and the handover-target radio base station T-eNB are under the control of the same upper level nodes MME/SGW.

The handover-source radio base station S-eNB is configured to judge whether or not user plane data to be forwarded to the handover-target radio base station T-eNB exists (that is, whether or not the user plane data should be forwarded to the handover-target radio base station T-eNB) for each access bearer set up between the upper level node SGW and the handover-source radio base station S-eNB, when determining to perform a handover for the mobile station UE.

The handover-source radio base station S-eNB is configured to notify, to the handover-target radio base station T-eNB, a result of the judgment by a handover request message "Handover Request" for the mobile station UE.

Specifically, the handover request message "Handover Request" for the mobile station UE may be configured to include instruction information indicating whether or not user plane data to be forwarded to the handover-target radio base station T-eNB exists for each access bearer.

For example, as shown in FIG. 3, an information element "Forwarding Indicator" for notifying of such instruction information may be newly added to the format of the "Handover Request" specified in the "3GPP TS36.423".

The information element "Forwarding Indicator" is for notifying of the instruction information indicating whether or not user plane data to be forwarded to the handover-target radio base station T-eNB exists for the access bearer identified by the "SAE Bearer ID".

Also, the handover request message "Handover Request" for the mobile station UE may be configured to include a list of access bearers for which user plane data to be forwarded to the handover-target radio base station T-eNB exists.

For example, as shown in FIG. 4, an information element "SAE Bearers To Be Forwarded List" for notifying of such list of access bearers may be newly added to the format of the "Handover Request" specified in the "3GPP TS36.423".

The handover-target radio base station T-eNB is configured to set up, as described above, a data forwarding GTP tunnel for forwarding user plane data from the handover-source radio base station S-eNB to the handover-target radio base station T-eNB only for the access bearers for which user plane data to be forwarded exists.

That is, the handover-target radio base station T-eNB is configured to set up no data forwarding GTP tunnel for the access bearer corresponding to the user plane data, even when user plane data exists, and if there exists no user plane data to be forwarded to the handover-target radio base station T-eNB.

In the example of FIG. 2, access bearers #A to #C are set up between the handover-source radio base station S-eNB and the upper level node SGW. However, for the access bearer #B, no user plane data to be forwarded to the handover-target radio base station T-eNB exists, or there is no need to forward user plane data to the handover-target radio base station T-eNB, and thus only data forwarding GTP tunnels #A and #C corresponding to the access bearers #A and #C are set up.

The handover-target radio base station T-eNB is configured to notify, to the handover-source radio base station S-eNB, setup information on the data forwarding GTP tunnel which has been set up by a handover request response message "Handover Request ACK" for the handover request message "Handover Request".

The setup information on the data forwarding GTP tunnel is a GTP TE-ID (GTP TE-ID#A and GTP TE-ID#C in the example of FIG. 2) for the handover-target radio base station T-eNB in the data forwarding GTP tunnel.

For example, as shown in FIG. 5, an information element "Forwarding GTP Tunnel Endpoint" for notifying of such setup information on the data forwarding GTP tunnel may be newly added to the format of the "Handover Request ACK" specified in the "3GPP TS36.423".

Alternatively, as shown in FIG. 6, an information element "SAE Bearers Forwarded List" for notifying of setup information on all the data forwarding GTP tunnels included in the above-mentioned list may be newly added to the format of the "Handover Request ACK" specified in the "3GPP TS36.423".

Then, the handover-source radio base station S-eNB is configured to forward the user plane data corresponding to each access bearer to the handover-target radio base station T-eNB via the data forwarding GTP tunnel, on the basis of the notified setup information on the data forwarding GTP tunnel (the GTP TE-ID for the handover-target radio base station T-eNB in the data forwarding GTP tunnel.

[Operation of Mobile Communication System according to First Embodiment of Present Invention]

A handover operation in a mobile communication system according to the first embodiment of the present invention will be described with reference to FIG. 7.

Figure 7:
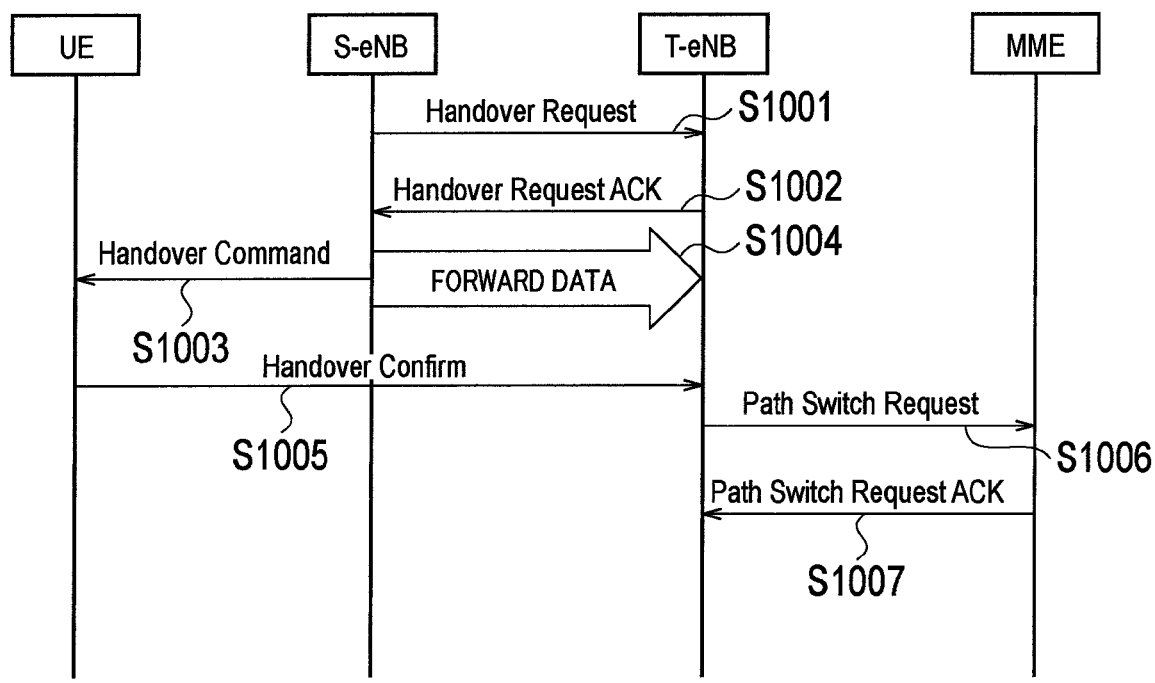
FIG. 7 is a sequence diagram showing a handover operation in the mobile communication system according to the first embodiment of the present invention.

As shown in FIG. 7, in step S1001, the handover-source radio base station S-eNB which has received the "Measurement Report" notified by the mobile station UE transmits the "Handover Request" to the handover-target radio base station T-eNB that has, for example, the highest communication quality out of the communication qualities reported from the mobile station UE.

Here, the "Handover Request" includes a judgment result for each access bearer as to whether or not user plane data to be forwarded to the handover-target radio base station T-eNB exists.

In Step S1002, when the handover-target radio base station T-eNB which has received the "Handover Request" can accept the mobile station UE, the handover-target radio base station T-eNB sets up, as described above, a data forwarding GTP tunnel for forwarding user plane data from the handover-source radio base station S-eNB to the handover-target radio base station T-eNB, only for the access bearers for which user plane data to be forwarded exists.

Subsequently, the handover-target radio base station T-eNB transmits the "Handover Request ACK" including setup information on the data forwarding GTP tunnel thus set up (the GTP TE-ID for the handover-target radio base station T-eNB in the data forwarding GTP tunnel) to the handover-source radio base station S-eNB.

In step S1003, the handover-source radio base station S-eNB which has received the "Handover Request ACK" transmits the "Handover Command" for commanding a handover to the mobile station UE.

In step S1004, on the basis of the notified setup information on the data forwarding GTP tunnel (the GTP TE-ID for the handover-target radio base station T-eNB in of the data forwarding GTP tunnel), the handover-source radio base station S-eNB forwards the user plane data corresponding to each access bearer to the handover-target radio base station T-eNB via the data forwarding GTP tunnel.

In step S1005, the mobile station UE receives the "Handover Command", and transmits the "Handover Confirm" to the handover-target radio base station T-eNB, when a resource for transmitting an uplink signal is assigned to the mobile station UE.

In step S1006, the handover-target radio base station T-eNB which has received the "Handover Confirm" transmits the "Path Switch Request" to the upper level node MME by using the GTP-U, the "Path Switch Request" requesting to switch a path for transmitting the user data from the handover-source radio base station S-eNB to the handover-target radio base station T-eNB.

In step S1007, the upper level node MME which has received the "Path Switch Request" transmits the "Path Switch Request ACK" to the handover-target radio base station T-eNB by using the GTP-U.

[Advantageous Effect of Mobile Communication System according to First Embodiment of Present Invention]

According to the mobile communication system of the first embodiment of the present invention, when a mobile station UE performs a handover from a handover-source radio base station S-eNB to a handover-target radio base station T-eNB, resources can be used effectively by eliminating redundant setup of data forwarding GTP tunnels for forwarding user plane data from the handover-source radio base station S-eNB to the handover-target radio base station T-eNB.

Second Embodiment of Present Invention

A mobile communication system according to a second embodiment of the present invention will be described with reference to FIGS. 8 to 15. In the following, point of difference between the mobile communication system according to the second embodiment and that according to the above-mentioned first embodiment will be mainly described.

Figure 8:
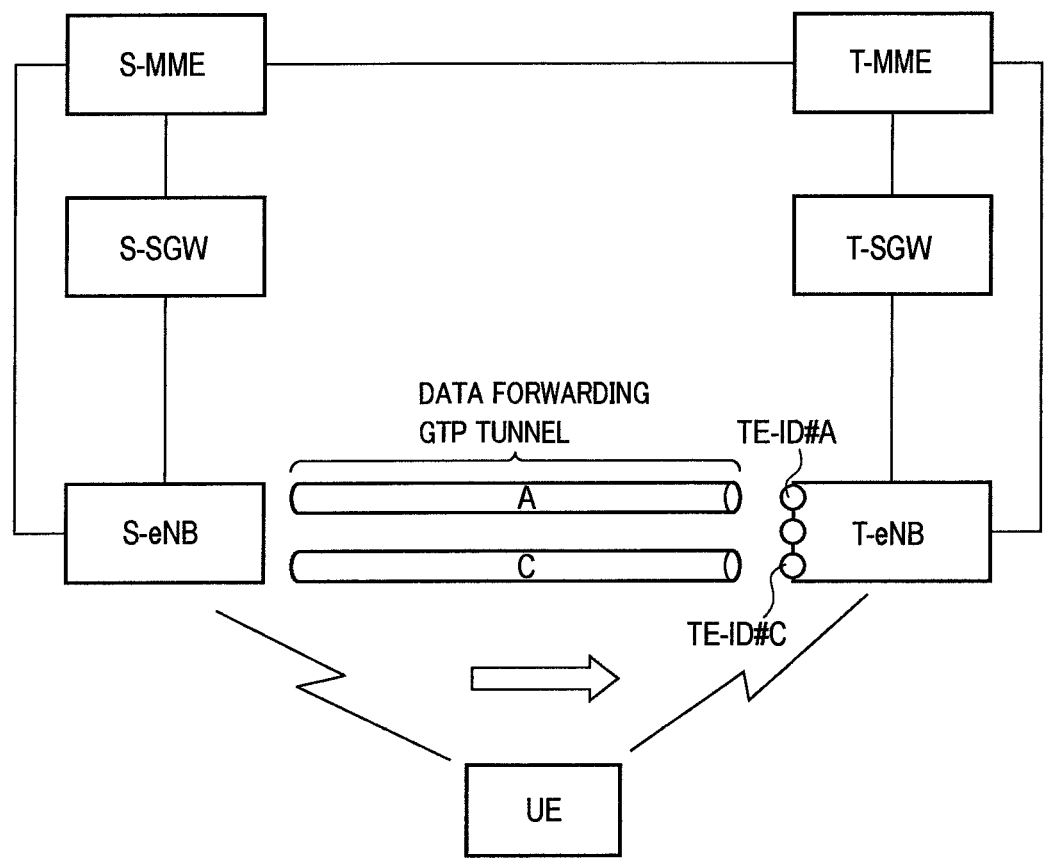
FIG. 8 is a diagram showing data forwarding GTP tunnels set up in a mobile communication system according to a second embodiment of the present invention.

As shown in FIG. 8, the second embodiment will be described based on a case where a mobile station UE performs a handover (S1 handover) from a handover-source radio base station S-eNB under the control of handover-source upper level nodes S-MME/S-SGW to a handover-target radio base station T-eNB under the control of handover-target upper level nodes T-MME/T-SGW.

In the second embodiment, data forwarding GTP tunnels are configured to be set up not through the upper level nodes (the handover-source upper level node S-SGW and the handover-target upper level node T-SGW).

That is, in the second embodiment, the handover-source radio base station S-eNB is configured to forward the user plane data corresponding to each access bearer to the handover-target radio base station T-eNB, not through the upper level nodes (the handover-source upper level node S-SGW and the handover-target upper level node T-SGW).

When a notice of determination ("Handover Required") that a handover is to be performed for the mobile station UE is received from the handover-source radio base station S-eNB, the handover-source upper level node S-MME is configured to judge whether or not user plane data to be forwarded to the handover-target radio base station T-eNB exists for each access bearer set up between the handover-source radio base station S-eNB and the upper level node SGW, on the basis of QoS (Quality of Service) information or the like.

The handover-target upper level node T-MME is configured to notify, to the handover-target radio base station T-eNB, such judgment result by using the handover request message "Handover Request" for the mobile station UE.

Specifically, the handover-target upper level node T-MME is configured to notify, to the handover-target radio base station T-eNB, such judgment result by transmitting the handover request message "Handover Request" for the mobile station UE to the handover-target radio base station T-eNB.

The handover request message "Handover Request" for the mobile station UE may be configured to include instruction information indicating whether or not user plane data to be forwarded from the handover-source radio base station S-eNB to the handover-target radio base station T-eNB exists for each access bearer.

For example, as shown in FIG. 9, an information element "Forwarding Indicator" for notifying of such instruction information may be newly added to the format of the "Handover Request" specified in the "3GPP TS36.413".

The information element "Forwarding Indicator" is for notifying of the instruction information indicating whether or not user plane data to be forwarded to the handover-target radio base station T-eNB exists for the access bearer identified by the "SAE Bearer ID".

Also, the handover request message "Handover Request" for the mobile station UE may be configured to include a list of access bearers for which user plane data to be forwarded to the handover-target radio base station T-eNB exists.

For example, as shown in FIG. 10, an information element "SAE Bearers To Be Forwarded List" for notifying of such list of access bearers may be newly added to the format of the "Handover Request" specified in the "3GPP TS36.413".

The handover-target radio base station T-eNB is configured to notify, to the handover-source radio base station S-eNB, the setup information on the data forwarding GTP tunnel set up between the handover-source radio base station S-eNB and the handover-target radio base station T-eNB, by transmitting the "Handover Request Acknowledge" to the handover-target upper level node T-MME, the "Handover Request Acknowledge" including the setup information on the data forwarding GTP tunnel.

For example, as shown in FIG. 11, an information element "GTP TEID" for notifying of such setup information on the data forwarding GTP tunnel may be newly added to the format of the "Handover Request Acknowledge" specified in the "3GPP TS36.413".

Alternatively, as shown in FIG. 12, an information element "SAE Bearers Forwarded List" for notifying of setup information on all the data forwarding GTP tunnels included in the above-mentioned list may be newly added to the format of the "Handover Request Acknowledge" specified in the "3GPP TS36.413".

The handover-source upper level node S-MME is configured to then notify, to the handover-source radio base station S-eNB, the setup information on the data forwarding GTP tunnel by the "Handover Command".

For example, as shown in FIG. 13, an information element "GTP TEID" for notifying of such setup information on the data forwarding GTP tunnel may be newly added to the format of the "Handover Command" specified in the "3GPP TS36.413".

The setup information on the data forwarding GTP tunnel notified to the handover-source radio base station S-eNB is the GTP TE-ID for the handover-target radio base station T-eNB in the data forwarding GTP tunnel (GTP TE-ID#A and GTP TE-ID#C in the example of FIG. 8).

A handover operation in the mobile communication system according to the second embodiment of the present invention will be described next with reference to FIG. 14.

Figure 14:
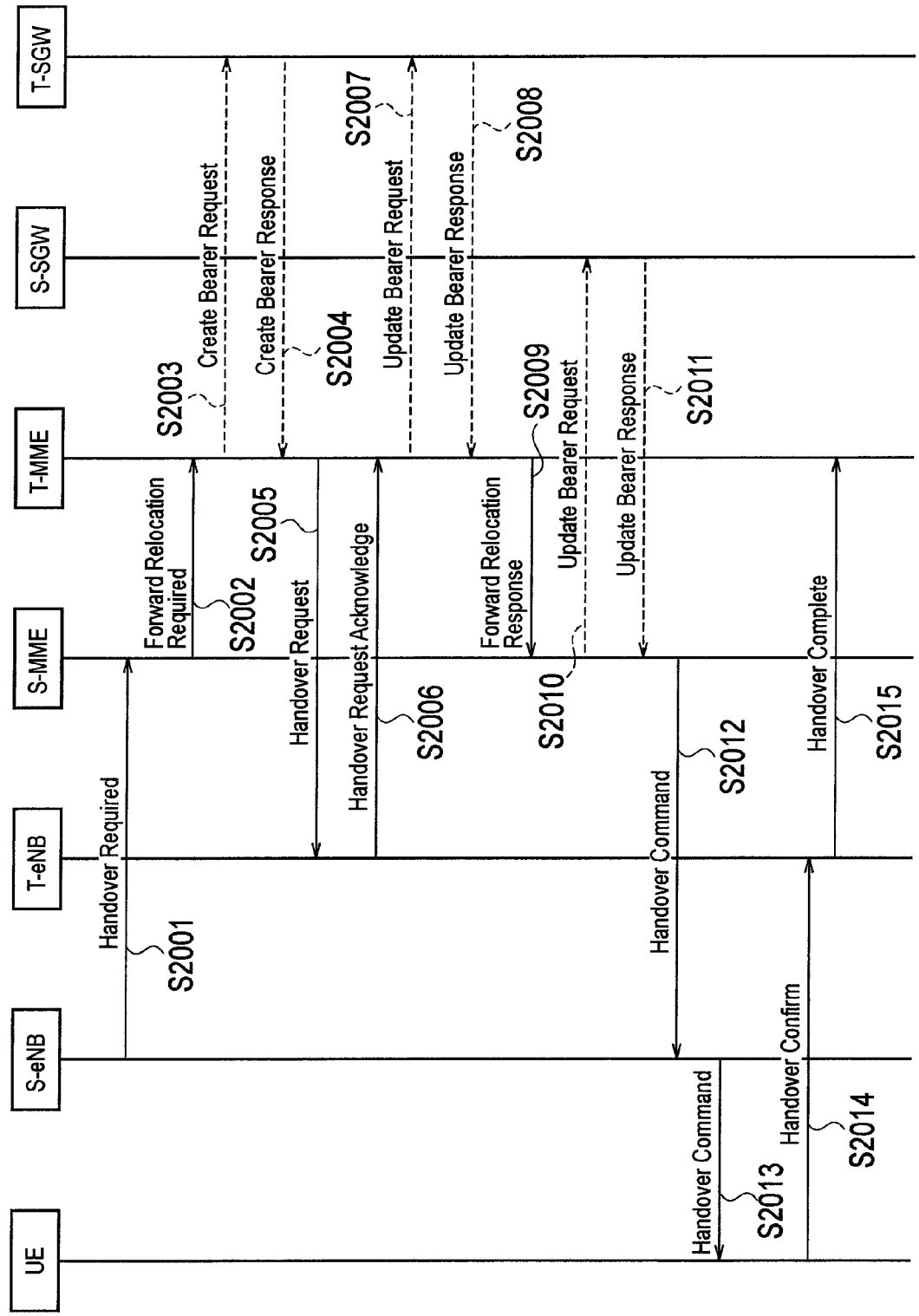
FIG. 14 is a sequence diagram showing a handover operation in the mobile communication system according to the second embodiment of the present invention.

As shown in FIG. 14, in step S2001, the handover-source radio base station S-eNB which has received the "Measurement Report" notified by the mobile station UE selects a handover-target radio base station T-eNB having, for example, the highest communication quality out of the communication qualities reported from the mobile station UE.

Then, the handover-source radio base station S-eNB transmits the "Handover Required" to the handover-source upper level node S-MME, the "Handover Required" being for notifying of a determination that a handover is to be performed for the mobile station UE.

The "Handover Required" does not include a judgment result for each access bearer as to whether or not user plane data to be forwarded from the handover-source radio base station S-eNB to the handover-target radio base station T-eNB exists.

In step S2002, the handover-source upper level node S-MME which has received the "Handover Required" judges whether or not user plane data to be forwarded from the handover-source radio base station S-eNB to the handover-target radio base station T-eNB exists for each access bearer set up between the handover-source radio base station S-eNB and the handover-source upper level node S-MME, by taking QoS information or the like into consideration. The handover-source upper level node S-MME transmits the "Forward Relocation Required" for notifying of the judgment result to the handover-target upper level node T-MME.

Instep S2003, the handover-target upper level node T-MME transmits the "Create Bearer Request" to the handover-target upper level node T-SGW. In step S2004, the handover-target upper level node T-SGW which has received the "Create Bearer Request" returns the "Create Bearer Response" to the handover-target upper level node T-MME.

In step S2005, the handover-target upper level node T-MME transmits the "Handover Request" for notifying of the above-mentioned judgment result to the handover-target radio base station T-eNB.

In step S2006, when capable of accepting the mobile station UE, the handover-target radio base station T-eNB sets up, as described above, a data forwarding GTP tunnel for forwarding user plane data from the handover-source radio base station S-eNB to the handover-target radio base station T-eNB, only for the access bearers for which user plane data to be forwarded exists.

Subsequently, the handover-target radio base station T-eNB transmits the "Handover Request Acknowledge" including the setup information on the data forwarding GTP tunnel thus set up to the handover-source radio base station S-eNB (the GTP TE-ID for the handover-target radio base station T-eNB in the data forwarding GTP tunnel) to the handover-source radio base station S-eNB.

In step S2007, the handover-target upper level node T-MME transmits the "Update Bearer Request" to the handover-target upper level node T-SGW. In step S2008, the handover-target upper level node T-SGW which has received the "Update Bearer Request" returns the "Update Bearer Response" to the handover-target upper level node T-MME.

Instep S2009, the handover-target upper level node T-MME which has received the "Update Bearer Response" transmits the "Forward Relocation Response" for notifying of the determination result to the handover-source host node S-MME.

In step S2010, the handover-source upper level node S-MME transmits the "Update Bearer Request" to the handover-source upper level node S-SGW. In step S2011, the handover-source upper level node S-SGW which has received the "Update Bearer Request" returns the "Update Bearer Response" to the handover-source upper level node S-MME.

In step S2012, the handover-source upper level node S-MME transmits the "Handover Command" including the setup information on the data forwarding GTP tunnel thus set up (the GTP TE-ID for the handover-target radio base station T-eNB in the data forwarding GTP tunnel) to the handover-source radio base station S-eNB.

At this point, the handover-source radio base station S-eNB forwards the user plane data corresponding to each access bearer to the handover-target radio base station T-eNB via the data forwarding GTP tunnel, on the basis of the notified setup information on the data forwarding GTP tunnel (the GTP TE-ID for the handover-target radio base station T-eNB in the data forwarding GTP tunnel).

In step S2013, the handover-source radio base station S-eNB transmits the "Handover Command" for commanding a handover to the mobile station UE.

In step S2014, the mobile station UE receives the "Handover Command", and transmits the "Handover Confirm" to the handover-target radio base station T-eNB, when a resource for transmitting an uplink signal is assigned to the mobile station UE.

In step S2015, the handover-target radio base station T-eNB transmits the "Handover Complete" for notifying of the completion of the handover to the handover-target upper level node T-MME.

[Modification 1]

A mobile communication system according to a modification 1 of the second embodiment of the present invention will be described with reference to FIG. 15. In the following, point of difference between the mobile communication system according to the modification 1 and that according to the above-mentioned the second embodiment will be mainly described.

Figure 15:
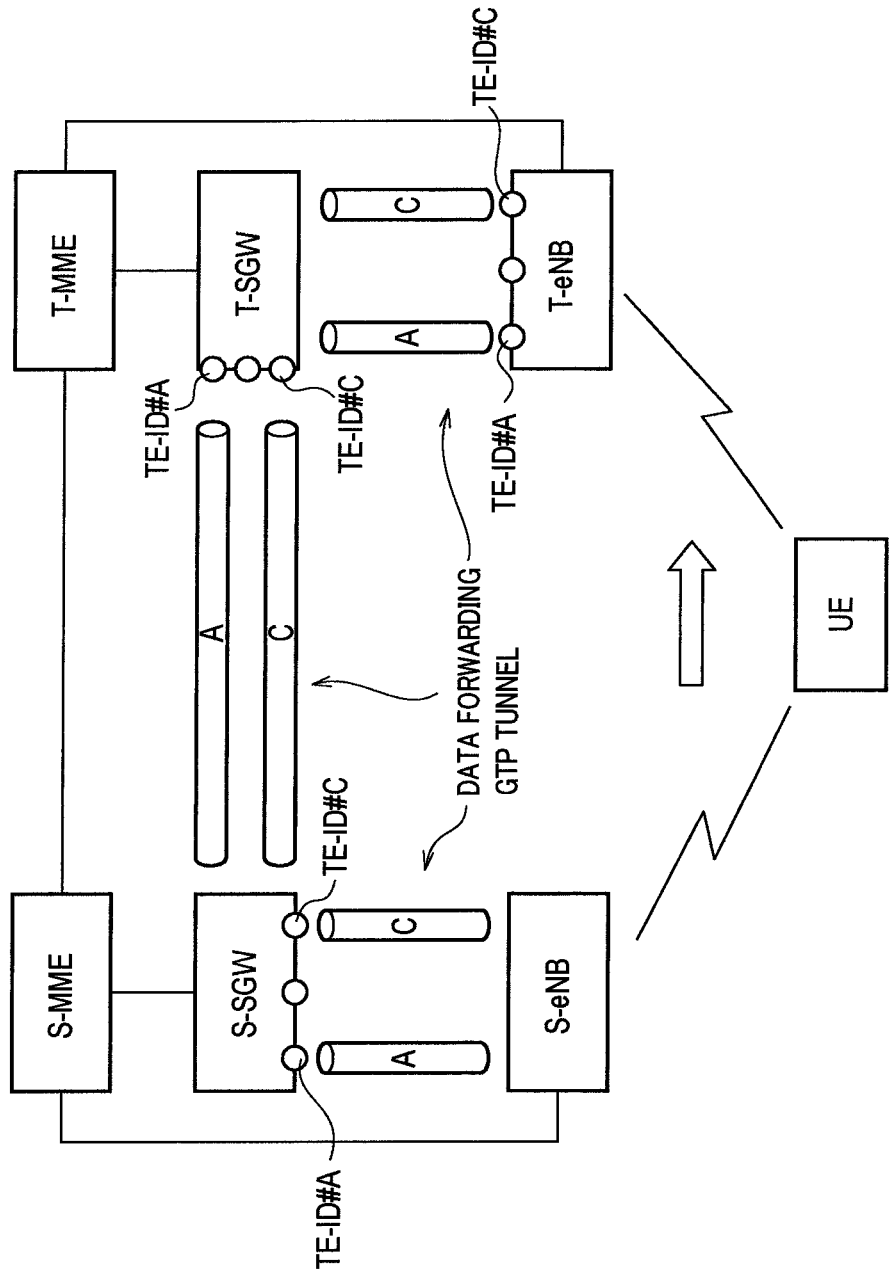
FIG. 15 is a diagram showing data forwarding GTP tunnels set up in a mobile communication system according to a first modification of the present invention.

As shown in FIG. 15, the modification 1 will be described based on a case where a mobile station UE performs a handover (S1 handover) from a handover-source radio base station S-eNB under the control of handover-source upper level nodes S-MME/S-SGW to a handover-target radio base station T-eNB under the control of handover-target upper level nodes T-MME/T-SGW.

In the modification 1, as shown in FIG. 15, a data forwarding GTP tunnel is configured to be set up through the handover-source upper level node S-SGW and the handover-target upper level node T-SGW.

That is, in the modification 1, the handover-source radio base station S-eNB is configured to forward the user plane data corresponding to each access bearer to the handover-target radio base station T-eNB through the upper level nodes (the handover-source upper level node S-SGW and the handover-target upper level node T-SGW).

Thus, in the modification 1, the setup information on the data forwarding GTP tunnel notified to the handover-source radio base station S-eNB is the GTP TE-ID for the handover-source upper level node S-SGW in the data forwarding GTP tunnel.

Up to this point, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, the description herein is intended for illustrative purpose and does not have any restrictive meaning to the present invention.

Japanese Patent Application No. 2007-282380 (filed on Oct. 30, 2007) is incorporated herein by reference in its entirety.

INDUSTRIAL APPLICABILITY

As described above, according to the present invention, it is possible to provide a mobile communication method and a radio base station by which, when a mobile station performs a handover from a handover-source radio base station to a handover-target radio base station, resources can be used effectively by eliminating redundant setup of GTP tunnels for forwarding user plane data from the handover-source radio base station to the handover-target radio base station.

The invention claimed is:

1. A mobile communication method in which a mobile station performs a handover from a handover-source radio base station to a handover-target radio base station, the method comprising the steps of:
   (A) judging whether or not user plane data to be forwarded to the handover-target radio base station exists for each access bearer set up with an upper level node, when a handover for the mobile station is determined to be performed;
   (B) notifying, to the handover-target radio base station, a result of the judgment by using a handover request message for the mobile station;
   (C) setting up a data forwarding tunnel for forwarding user plane data from the handover-source radio base station to the handover-target radio base station only for an access bearer for which the user plane data to be forwarded exists, and notifying, to the handover-source radio base station, setup information on the data forwarding tunnel by using a handover request response message for the handover request message; and
   (D) forwarding the user plane data to the handover-target radio base station by the handover-source radio base station via the data forwarding tunnel on the basis of the setup information on the data forwarding tunnel,
   wherein the handover request message for the mobile station includes a list of the access bearers for which the user plane data to be forwarded to the handover-target radio base station exists.

2. The mobile communication method according to claim 1, wherein
   the handover-source radio base station and the handover-target radio base station are provided under the control of a same upper level node;
   in the step (A), the handover-source radio base station makes the judgment;
   in the step (B), the handover-source radio base station notifies, to the handover-target radio base station, the result of the judgment by using the handover request message for the mobile station; and
   in the step (C), the data forwarding tunnel is set up not through the upper level node.

3. The mobile communication method according to claim 2, wherein
   the setup information on the data forwarding tunnel is a GTP TE-ID for the handover-target radio base station in the data forwarding tunnel.

4. The mobile communication method according to claim 3, wherein
   the handover request message for the mobile station includes instruction information indicating whether or not the user plane data to be forwarded to the handover-target radio base station exists, for each access bearer.

5. The mobile communication method according to claim 3, wherein
   the handover request message for the mobile station includes a list of the access bearers for which the user plane data to be forwarded to the handover-target radio base station exists.

6. The mobile communication method according to claim 2, wherein
   the handover request message for the mobile station includes instruction information indicating whether or not the user plane data to be forwarded to the handover-target radio base station exists, for each access bearer.

7. The mobile communication method according to claim 2, wherein
   the handover request message for the mobile station includes a list of the access bearers for which the user plane data to be forwarded to the handover-target radio base station exists.

8. The mobile communication method according to claim 1, wherein
   the handover-source radio base station and the handover-target radio base station are provided under the control of different upper level nodes, respectively; and
   in the step (C), the data forwarding tunnel is set up through the upper level nodes, and the setup information on the data forwarding tunnel is notified to the handover-source radio base station through the upper level nodes.

9. The mobile communication method according to claim 8, wherein
   the setup information on the data forwarding tunnel is a GTP TE-ID for the upper level nodes in the data forwarding tunnel.

10. The mobile communication method according to claim 9, wherein
    the handover request message for the mobile station includes instruction information indicating whether or not the user plane data to be forwarded to the handover-target radio base station exists, for each access bearer.

11. The mobile communication method according to claim 9, wherein
    the handover request message for the mobile station includes a list of the access bearers for which the user plane data to be forwarded to the handover-target radio base station exists.

12. The mobile communication method according to claim 8, wherein
    the handover request message for the mobile station includes instruction information indicating whether or not the user plane data to be forwarded to the handover-target radio base station exists, for each access bearer.

13. The mobile communication method according to claim 8, wherein
    the handover request message for the mobile station includes a list of the access bearers for which the user plane data to be forwarded to the handover-target radio base station exists.

14. The mobile communication method according to claim 1, wherein
    the handover-source radio base station and the handover-target radio base station are provided under the control of different upper level nodes, respectively; and
    in the step (C), the data forwarding tunnel is set up not through the upper level nodes, and the setup information on the data forwarding tunnel is notified to the handover-source radio base station not through the upper level nodes.

15. The mobile communication method according to claim 14, wherein
the handover request message for the mobile station includes instruction information indicating whether or not the user plane data to be forwarded to the handover-target radio base station exists, for each access bearer.

16. The mobile communication method according to claim 14, wherein
the handover request message for the mobile station includes a list of the access bearers for which the user plane data to be forwarded to the handover-target radio base station exists.

17. The mobile communication method according to claim 1, wherein
the handover request message for the mobile station includes instruction information indicating whether or not the user plane data to be forwarded to the handover-target radio base station exists, for each access bearer.

18. A radio base station capable of serving as a handover-target radio base station in a mobile communication system in which a mobile station can perform a handover, wherein
the handover-target radio base station is configured to set up a data forwarding tunnel for forwarding user plane data to the handover-target radio base station only for an access bearer for which the user plane data to be forwarded exists, when receiving a notification from a handover-source radio base station as to whether or not the user plane data to be forwarded exists for each access bearer, the notification being made by using a handover request message for the mobile station, and the access bearer being set up between the handover-source radio base station and a upper level node; and
the handover-target radio base station is configured to notify, to the handover-source radio base station, setup information on the data forwarding tunnel by using a handover request response message for the handover request message,
wherein the handover request message for the mobile station includes a list of the access bearers for which the user plane data to be forwarded to the handover-target radio base station exists.

19. The radio base station according to claim 18, wherein
the handover request message for the mobile station includes instruction information indicating whether or not the user plane data to be forwarded to the radio base station exists for each access bearer.

20. The radio base station according to claim 18, wherein
the handover request message for the mobile station includes a list of the access bearers for which the user plane data to be forwarded to the handover-target radio base station exists.

21. The radio base station according to claim 18, wherein
the handover-source radio base station and the handover-target radio base station are provided under the control of a same upper level node;
the data forwarding tunnel is set up not through the upper level node; and
the setup information on the data forwarding tunnel is a GTP TE-ID for the handover-target radio base station in the data forwarding tunnel.

22. The radio base station according to claim 18, wherein
the handover-source radio base station and the handover-target radio base station are provided under the control of different upper level nodes, respectively;
the handover request message for the mobile station is transmitted to the handover-target radio base station through a handover-source upper level node and a handover-target upper level node;
the data forwarding tunnel is set up through the handover-source upper level node and the handover-target upper level node;
the setup information on the data forwarding tunnel is notified to the handover-source radio base station through the handover-source upper level node and the handover-target upper level node; and
the setup information on the data forwarding tunnel notified to the handover-source radio base station is a GTP TE-ID for the handover-source upper level node in the data forwarding tunnel.

23. A radio base station capable of serving as a handover-target radio base station in a mobile communication system in which a mobile station can perform a handover, wherein
the handover-target radio base station is configured to set up a data forwarding tunnel for forwarding user plane data to the handover-target radio base station only for an access bearer for which the user plane data to be forwarded exists, when receiving a notification from a upper level node as to whether or not the user plane data to be forwarded exists for each access bearer, the notification being made by using a handover request message for the mobile station, and the access bearer being set up between a handover-source radio base station and the upper level node;
the handover-target radio base station is configured to notify, to the handover-source radio base station, setup information on the data forwarding tunnel via the upper level node by using a handover request response message for the handover request message; and
the handover request message for the mobile station includes a list of the access bearers for which the user plane data to be forwarded to the handover-target radio base station exists.

24. The radio base station according to claim 23, wherein
the handover request message for the mobile station includes instruction information indicating whether or not the user plane data to be forwarded to the radio base station exists for each access bearer.

25. The radio base station according to claim 23, wherein
the handover request message for the mobile station includes a list of the access bearers for which the user plane data to be forwarded to the handover-target radio base station exists.

26. The radio base station according to claim 23, wherein
the handover-source radio base station and the handover-target radio base station are provided under the control of a same upper level node;
the data forwarding tunnel is set up not through the upper level node; and
the setup information on the data forwarding tunnel is a GTP TE-ID for the handover-target radio base station in the data forwarding tunnel.

27. A radio base station capable of serving as a handover-source radio base station in a mobile communication system in which a mobile station can perform a handover, wherein
the handover-source radio base station is configured to judge whether or not user plane data to be forwarded to a handover-target radio base station exists for each access bearer set up with an upper level node, when a handover for the mobile station is determined to be performed;

the handover-source radio base station is configured to notify, to the handover-target radio base station, a result of the judgment by using a handover request message for the mobile station; and the handover request message for the mobile station includes a list of the access bearers for which the user plane data to be forwarded to the handover-target radio base station exists.

* * * * *